Oct. 13, 1936.       R. ERBAN       2,057,482
FRICTION GEAR
Filed Oct. 21, 1933       4 Sheets-Sheet 1

INVENTOR.
RICHARD ERBAN.
BY
ATTORNEY.

Oct. 13, 1936.                R. ERBAN                2,057,482
                            FRICTION GEAR
                       Filed Oct. 21, 1933         4 Sheets-Sheet 2

INVENTOR.
RICHARD ERBAN.
BY
ATTORNEY.

Oct. 13, 1936.                R. ERBAN                2,057,482
                            FRICTION GEAR
                         Filed Oct. 21, 1933          4 Sheets-Sheet 3
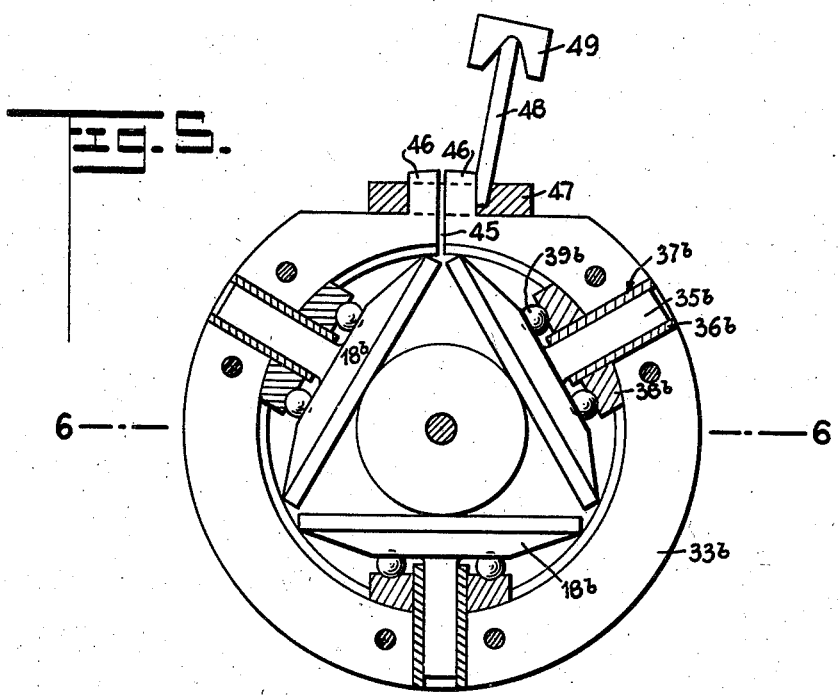
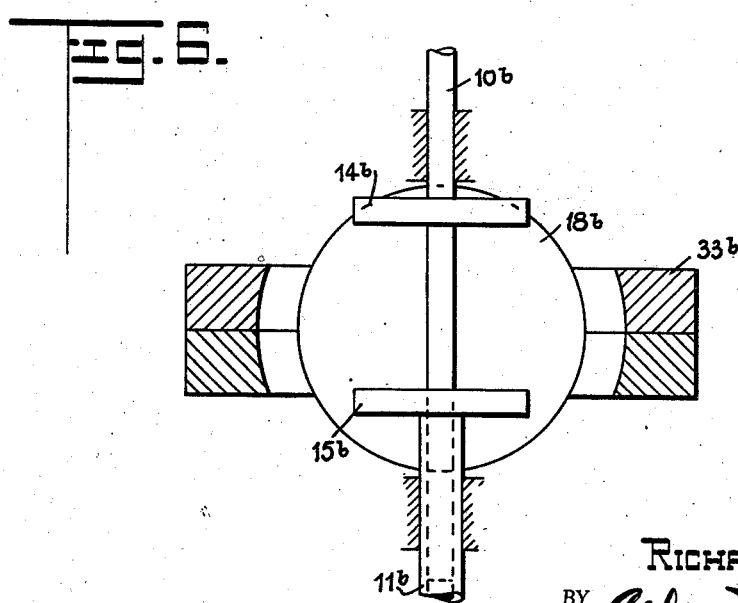
INVENTOR.
RICHARD ERBAN.
BY
ATTORNEY.

Oct. 13, 1936.    R. ERBAN    2,057,482
FRICTION GEAR
Filed Oct. 21, 1933    4 Sheets-Sheet 4
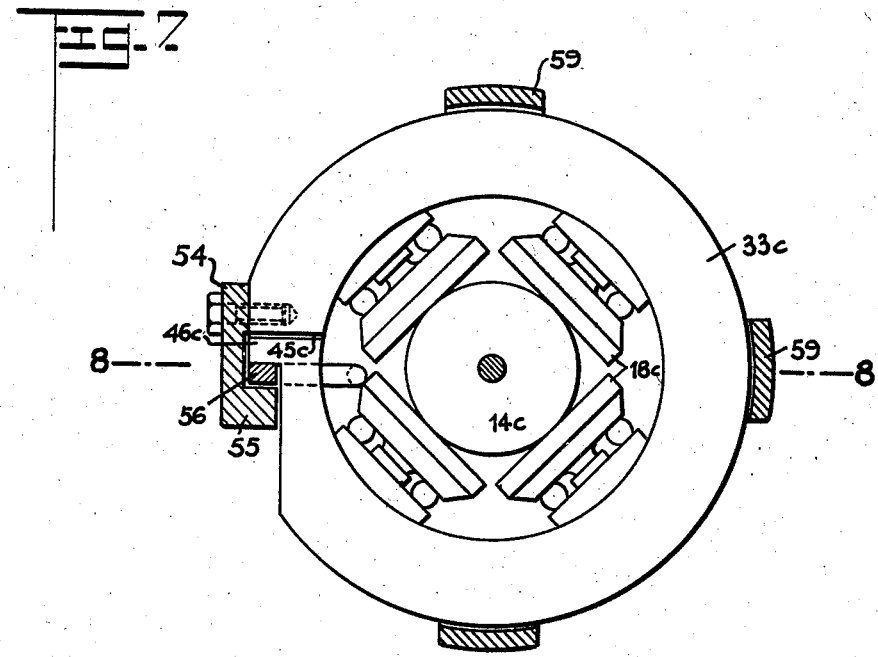
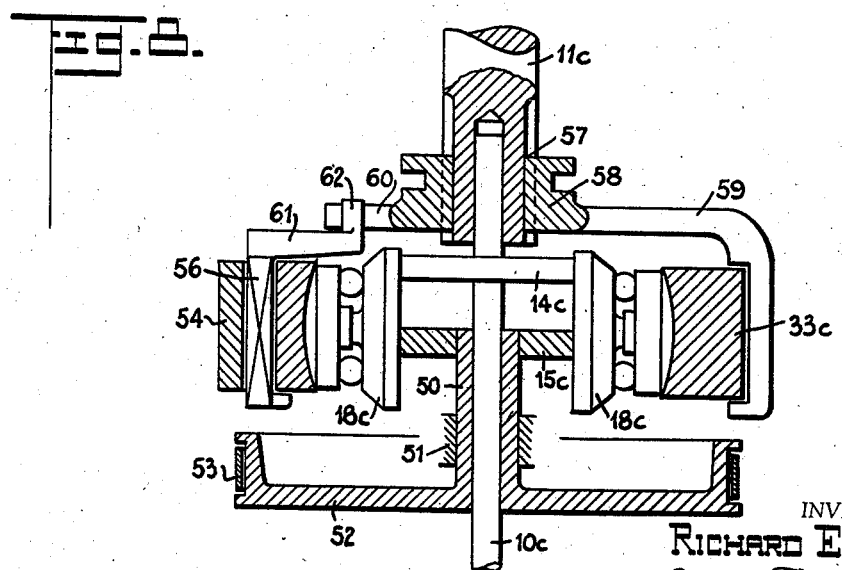
INVENTOR.
RICHARD ERBAN.
BY
ATTORNEY.

Patented Oct. 13, 1936

2,057,482

UNITED STATES PATENT OFFICE 2,057,482

FRICTION GEAR

Richard Erban, Vienna, Austria, assignor to Erban Patents Corporation, a corporation of New York Application October 21, 1933, Serial No. 694,633
In Austria February 3, 1933

22 Claims. (Cl. 74—281)

This invention relates to friction gears, and has particular reference to improvements in friction gears of the general type in which axially alined driving and driven shafts are equipped with friction wheels, and in which power is transmitted between said shafts by means of friction disks which engage the peripheries of said friction wheels and which are rotatable on axes at right angles to the common axis of the shafts.

In friction gears of the foregoing general type, variations in speed ratio are obtained either by shifting the friction disks along the common axis of the shafts, or by axially shifting the friction wheels relative to the friction disks, and every change in the gear ratio necessitates a change in the pressure of the friction disks against the friction wheels in order that the gear may operate at highest efficiency for transmission of power. In other words, the higher the gear ratio the greater is the required pressure between the friction disks and the friction wheels, and the lower the gear ratio the lesser is the required pressure between the friction disks and the friction wheels to assure transmission of any given torque without slippage between the friction wheels and the friction disks. Therefore, it is not conducive to efficiency or longevity of a friction gear of the type mentioned to have the friction disks urged against the friction wheels under a single, unvarying pressure for different ratios of the gear, as this would result in inadequate pressure for higher ratios and excessive pressure for lower gear ratios. In this connection it has been proposed heretofore to utilize the torque of one of the gear shafts to regulate the pressure of the friction disks against the friction wheels, thus to obtain a variation in the pressure in accordance with the torque transmitted by the gear. However, according to all prior pressure varying arrangements operating on this principle, the pressure is properly varied in response to differences in the torque transmitted only for a single, definite speed ratio of the gear, and for all other speed ratios of the gear the pressure variation is incorrect. Accordingly, the general object of the present invention is to provide, in a friction gear of the type mentioned, novel and practical means whereby the pressure of the friction disks against the friction wheels is properly maintained according to the torque transmitted and for all speed ratios of the gear.

With the foregoing and various other objects in view, which will become more fully apparent as the nature of the invention is better understood, the same consists in the novel combination and arrangement of features as will be hereinafter more fully described, illustrated in the accompanying drawings and defined in the appended claims.

In the drawings, wherein are illustrated different practical embodiments of the invention and wherein like characters of reference denote corresponding parts in the different views:

Figure 5 is a transverse section through a friction gear according to another embodiment of the invention.

Figure 6 is a section on the line 6—6 of Figure 5.

Figure 7 is a transverse section through a friction gear according to still another embodiment of the invention; and Figure 8 is a section on the line 8—8 of Figure 7.

Figure 1:
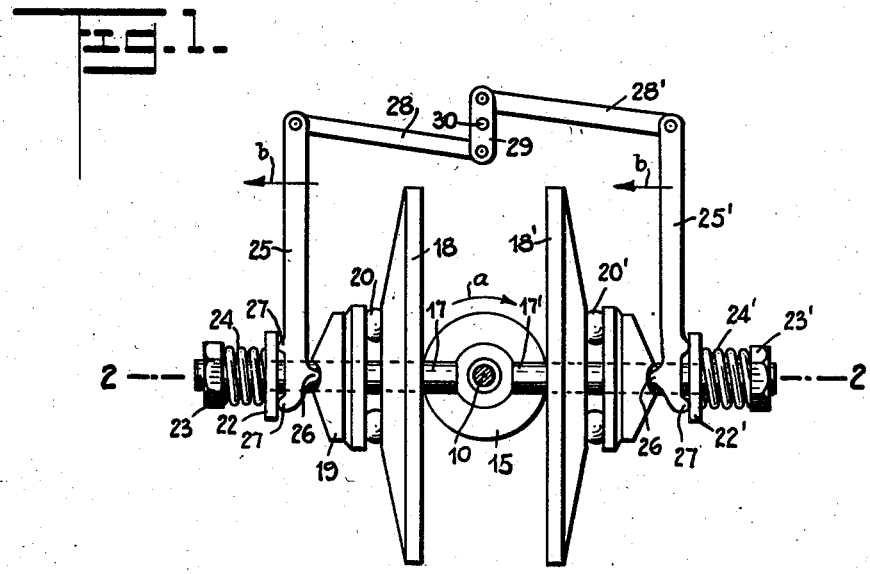
Figure 1 is an end elevation of a friction gear according to one embodiment of the invention.

Referring to the drawings in detail, first with particular reference to the practical embodiment of the invention illustrated in Figures 1 and 2, 10 and 11 designate a pair of axially alined shafts, either of which may be the driving shaft and the other the driven shaft of the gear. These shafts are journaled in bearings 12 and 13, respectively, and, in the present instance, the shaft 11 is hollow and receives the free end portion of the shaft 10, thus to assist in maintaining axial alinement of said shafts. On said shafts are fixed friction wheels 14 and 15, respectively.

Journaled on the shaft 10 for rotation relative thereto is a member 16 having shaft elements 17, 17' which are disposed at opposite sides of the shaft 10 and which are axially alined and have their common axis intersecting the axis of the shaft 10 at right angles thereto and between the friction wheels 14, 15. On these shaft elements are journaled, both for rotation relative thereto and for sliding movement therealong, friction disks 18, 18', respectively, having flat inner faces with which are engaged the peripheries of the friction wheels 14 and 15.

Assuming that the shaft elements 17, 17' are held against revolving about the shaft 10 and that the friction disks 18, 18' are urged against the friction wheels 14, 15, it is apparent that rotation of either shaft 10 or 11 will result in rotation of the friction disks 18, 18' in opposite directions by the related friction wheel 14 or 15 as the case may be, with consequent rotation of the other friction wheel and the shaft by which it is carried in a direction counter to the direction of rotation of the first shaft, and that for any given speed of the first shaft the other shaft will be rotated at a rate of speed which is dependent upon the distances of the friction wheels 14, 15 from the common axis of the friction disks 18, 18'. In other words, the gear ratio of a gear of the type illustrated may be varied by varying the distances between the friction wheels 14, 15 and the common axis of the friction disks 18, 18', and in accordance with the invention this may be done in any suitable manner, either by shifting the friction wheels 14, 15 axially relative to the friction disks 18, 18', or by shifting said friction disks parallel to the common axis of the shafts 10, 11.

Mounted on the shaft elements 17, 17' outwardly of the friction disks 18, 18' are race elements 19, 19', respectively, and between said race elements and said friction disks are interposed anti-friction balls 20, 20', respectively. Also mounted on the shaft elements 17, 17', outwardly of the race elements 19, 19', are disks 21, 21', respectively, and, as shown, said disks have convex spherical inner surfaces against which seat companion convex outer spherical surfaces of the race elements 19, 19'. Outwardly of the disks 21, 21' the shaft elements 17, 17' have slidably mounted thereon washers 22, 22', respectively, while threaded on said shaft elements, outwardly of said washers are nuts 23, 23', respectively. Between the washers 22, 22' and the nuts 23, 23' are interposed coil springs 24, 24', respectively, while between the disks 21, 21' and said washers are interposed the end portions of levers 25, 25', respectively. The said end portions of said levers are provided at their inner sides with protuberances 26 which engage in notches in the outer faces of the disks 21, 21', respectively, while at their outer sides they are each provided with a pair of protuberances 27, 27 disposed to opposite sides of the shaft elements 17, 17' in the direction of extent of the levers. Moreover, at their outer ends said levers are connected by links 28, 28', respectively, with the ends of a lever 29 which has a fixed intermediate pivot 30. Obviously, rocking movement of either lever in either direction results in one or the other of the protuberances 27 fulcruming against the related washer 22 or 22' and the protuberance 26 fulcruming against the related disk 21 or 21', with consequent inward pressure of the related friction disk 18 or 18' against the friction wheels 14, 15. Obviously, too, due to the equalizing connection between said levers, rocking of either lever results in rocking of the other lever so that both friction disks 18, 18' always are subjected to the same inward pressure. Furthermore, it is apparent that rotation of the member 16 about the common axis of the shafts 10, 11 is effective to rock the levers 25, 25'.

Now, assuming a normal status of the gear as illustrated in the drawings and according to which status the friction disks 18, 18' are urged against the peripheries of the friction wheels under a normal pressure which is determined by the compression of the springs 24, 24' by the nuts 23, 23', it is apparent that if, for example, the shaft 10 is subjected to rotation in the direction of the arrow $a$ in Figure 1, the friction disks 18, 18' and, conjointly therewith, the shaft elements 17, 17' and the thrust levers 25, 25' will tend to rotate in the same direction about the common axis of the shafts 10, 11. Since, however, the pivot 30 of the lever 29 is fixed, the tendency of the levers 25, 25' to rotate bodily will be resisted and said levers will be caused to partake of rocking motions in the directions of the arrows $b$ in Figure 1, with the result that the friction disks will be urged inwardly against the friction wheels under a pressure which is proportional to the torque to which the gear is subjected for any ratio of the gear. In other words, an arrangement as shown and described assures a constant relationship between the pressure force and the circumferential force for each of the points of contact between the friction wheels and the friction disks, regardless of the relative positions of the friction wheels and disks, so that, no matter what may be the speed ratio between said wheels and disks, slippage of the gearing or the imposition of inadmissibly high loads thereon is avoided, assuming, of course, a selection of the dimensions of the active leverages of the lever system to obtain pressures best suited to obtain optimum efficiency of the gear.

The race elements 19, 19' are more or less loosely mounted on the shaft elements 17, 17' whereby they may partake of universal sliding movements relative to their supporting disks 21, 21'. Thus, due to the coacting spherical formation of the adjacent or engaging faces of said race elements and their supporting disks, said race elements are self-adjusting to distribute the force applied by the levers 25, 25' upon the points of contact between the friction wheels and the friction disks at the ratio of the distances of said points from the common axis of the friction disks.

Figure 2:
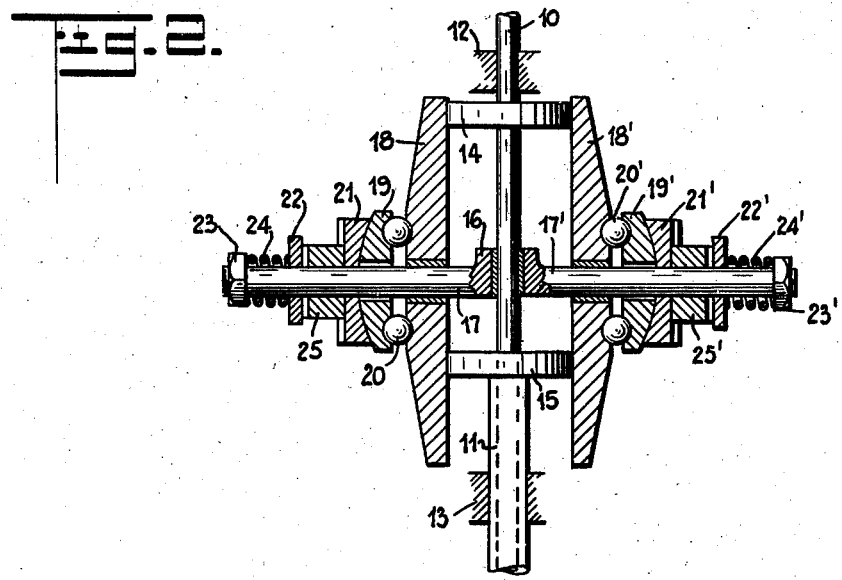
Figure 2 is a section on the line 2—2 of Figure 1.
Figure 3:
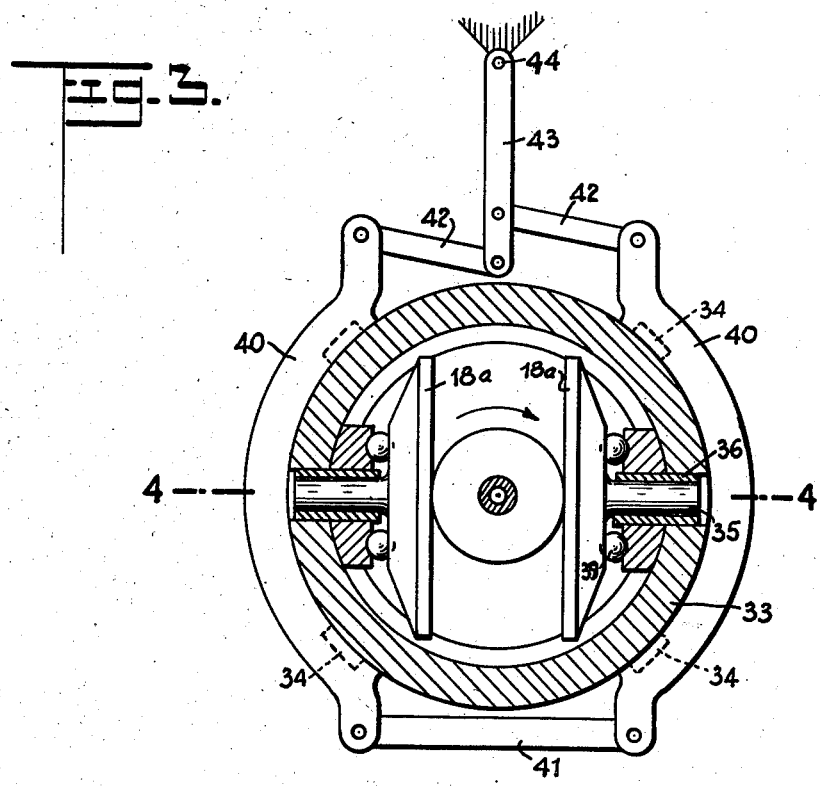
Figure 3 is a transverse section through a friction gear according to another embodiment of the invention.
Figure 4:
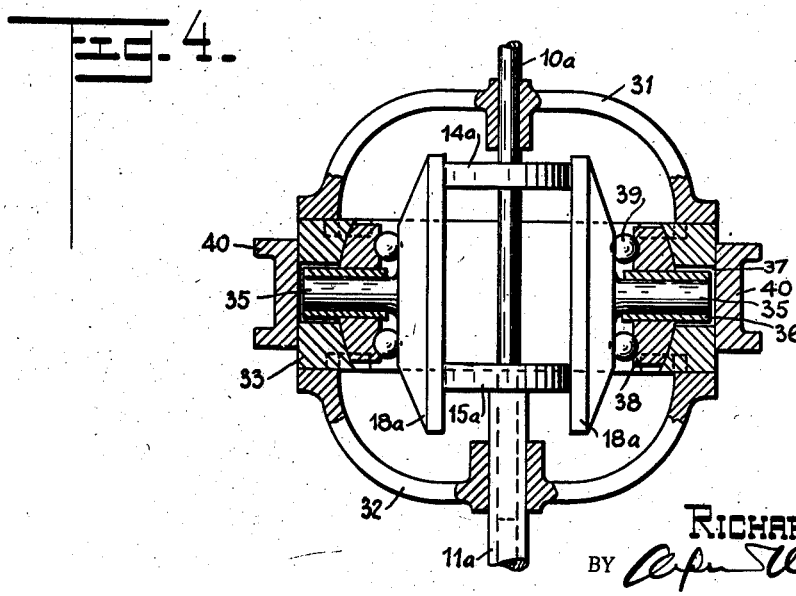
Figure 4 is a section on the line 4—4 of Figure 3.

According to the arrangement illustrated in Figures 1 and 2 the member 16 precludes contacting of the centers of the friction disks 18, 18' by the friction wheels 14, 15. Therefore, the gear has a limited speed ratio range. Moreover, when the gear is transmitting power considerable forces are imposed on the friction disks tending to move the same from their normal operative positions. Therefore, it is important to provide for firmly supporting said friction disks. Figures 3 and 4 of the drawings illustrate an arrangement in which the friction wheels may contact with the centers of the friction disks and in which the friction disks are supported in an exceptionally firm manner.

Referring in detail to the arrangement illustrated in Figures 3 and 4, 10a, 11a designate a pair of axially alined shafts on which are fixed friction wheels 14a, 15a, respectively. On said shafts are rotatably mounted supports 31, 32, respectively, and between these supports is confined a thrust ring 33 which normally is maintained axially alined with the shafts 10a, 11a by means of lugs 34 which project inwardly from the supports 31, 32 and engage the outer face of said ring. Disposed at opposite sides of the friction wheels 14a, 15a are friction disks 18a which have flat inner faces engaging the peripheries of said friction wheels. Moreover, each of said friction disks is provided centrally thereof with an outwardly directed stub shaft 35 which is rotatable within a sleeve or bushing 36, each bushing extending into a related opening 37 in the thrust ring 33 and having closely fitted thereon, inwardly of the thrust ring, a race element 38. The inner face of the thrust ring is of concave spherical form and the outer faces of the race elements 38 are of convex spherical form and seat snugly against the inner face of the thrust ring. Between each race element and the outer face of the related friction disk is interposed a series of anti-friction balls 39. The stub shafts 35 are axialy alined and their common axis intersects the common axis of the shafts 10a, 11a at right angles thereto, any creeping of the friction disks circumferentially with respect to the thrust ring 33 being prevented by reason of the bushings 36 snugly fitting the openings 37 in the circumferential direction of the thrust ring, as shown in Figure 3. However, said openings 37 are slightly elongated longitudinaly of the thrust ring as illustrated in Figure 4 whereby, due to the spherical engaging surfaces of the race elements 38 and the thrust ring, the friction disks 18a are self-adjusting to distribute their inwardly directed pressure between their points of contact with the friction wheels 14a, 15a.

Embracing the thrust ring 33 are two clamp shoes 40, 40 which are connected together at adjacent ends by a strap 41 and which, at their opposite ends, are connected by links 42 with the free end portion of a lever 43 at points spaced longitudinally thereof, said lever being mounted at its other end on a fixed pivot 44. Therefore, if the thrust ring and the clamp shoes are rotated in the direction of the arrow a in Figure 3 the clamp shoes will be contracted against the thrust ring.

The thrust ring 33 is deformable by pressure of the clamp shoes 40 thereagainst to urge the friction disks 18a inwardly under pressure against the friction wheels 14a, 15a. Hence, the lugs 34 which function to maintain the thrust ring 33 centered with respect to the common axis of the shafts 10a, 11a are disposed at points as shown which experience least change in distance from the common axis of the shafts 10a, 11a under deformation of the thrust ring by the clamp shoes 40.

Under normal conditions the thrust ring 33 urges the friction disks 18a under suitable pressure against the friction wheels 14a, 15a.

Assuming that either shaft 10a or 11a is rotated in the direction of the arrow a in Figure 3, it is apparent from the foregoing that the friction disks 18a, the thrust ring 33 and the clamp shoes 40 will tend to rotate with said shaft and that as a consequence the clamp shoes will be contracted against the thrust ring and will hold it against rotation and, at the same time, will exert a deforming pressure thereon which is reflected in like pressure of the friction disks against the friction wheels and which is proportional to the torque to which the gear is subjected for any ratio of the gear. Thus, by choosing suitable dimensions for the effective leverages of the lever system of the gear, optimum efficiency relationship between the circumferential force and the pressure at the points of contact of the friction disks with the friction wheels, and which is preserved for all speed ratios of the gear, can be obtained.

If the thrust ring 33 is permitted to rotate the gear obviously will not transmit power, since the friction disks 18a will simply rotate idly about the friction wheels 14a, 15a. Consequently, the gear is useful as a clutch to be actuated by holding and releasing the thrust ring according to requirements.

Manifestly, according to the construction illustrated in Figures 3 and 4 the thrust ring 33 affords a firm support for the friction disks 18a effectively holding them against movement from their operative positions. Moreover, because of the mounting of the friction disks in the manner shown, the space between said disks is unobstructed so that the gear may be adjusted to bring either of the friction wheels 14a, 15a into contact with the centers of said friction disks.

Figures 5 and 6 of the drawings illustrate an arrangement which is quite similar to the arrangement illustrated in Figures 3 and 4, but which is especially meritorious because it avoids the necessity of providing special means to center the friction disk carrying ring relative to the driving and the driven shafts of the gear.

Referring in detail to the arrangement illustrated in Figures 5 and 6, 10b, 11b designate a pair of shafts which are axially alined and carry friction wheels 14b, 15b, respectively, and either of which may be the driving shaft and the other the driven shaft of the gear. Coaxial with said shafts is a thrust ring 33b which, for simplicity of construction and for facile assembly of the gear, is formed in two half sections which may be riveted, bolted or otherwise suitably secured together. Three friction disks 18b are provided according to this embodiment of the invention and, as in the case of the first two embodiments of the invention, these friction disks have flat, inner faces which engage the peripheries of the friction wheels 14b, 15b. The friction disks 18b are spaced apart equal angular distances about the common axis of the shafts 10b, 11b with their axes in a common plane at right angles to the said common axis of said shafts and, moreover, said friction disks are disposed with their axes intersecting the common axis of the shafts 10b, 11b. Each disk is provided with an outwardly extending stub shaft 35b which is journaled in a sleeve or bushing 36b and the outer end portion of each sleeve or bushing is accommodated within an opening 37b in the thrust ring 33b in the same manner as set forth in connection with the Figures 3 and 4 embodiment of the invention. Moreover, the inner face of the thrust ring 33b is of concave spherical form and on each bushing 36b is snugly fitted a race element 38b having a convex spherical outer face engaging the inner face of the thrust ring, while between each race element and the related friction disk 18b is a series of anti-friction balls 39b.

The ring 33b is split as indicated at 45, and at each of the two ring ends thus formed is an outwardly projecting lug 46. Embracing said lugs is a yoke 47, and between one of said lugs and the adjacent wall of said yoke is disposed one end of a lever arm 48 the other end of which is rockably fulcrumed in a suitable fixed support 49. Thus, if the thrust ring is rotated the lever arm 48 is rocked and functions in an obvious manner to pinch the ring ends together, thereby contracting the ring and imposing pressure on the friction disks 18b which is reflected in intensification of the pressure of said friction disks against the friction wheels 14b, 15b.

The gear according to the Figures 5, 6 embodiment may be adjusted as set forth in connection with the Figures 1 to 4 embodiments to vary its ratio, and for any ratio of adjustment thereof the pressure of the friction disks 18b against the friction wheels 14b, 15b obviously is proportional to the torque transmitted. Obviously, too, because of the use of three friction disks 18b arranged as shown and described, the thrust ring 33b is held centered with respect to the common axis of the shafts 10b, 11b and the provision of any auxiliary means for this purpose is rendered entirely unnecessary.

According to each of the foregoing embodiments of the invention the arrangement is such that the driving and driven shafts of the gear rotate in opposite directions. As distinguished from this, Figures 7 and 8 of the drawings illustrate an embodiment of the invention in which the driving and driven shafts rotate in the same direction.

Referring in detail to Figures 7 and 8 of the drawings, 10c, 11c designate axially alined driving and driven shafts, respectively, the former of which has fixed thereon a friction wheel 14c. On the other hand, the second friction wheel 15c is fixed on a hollow shaft 50 which is journaled in a bearing 51 and through which the driving shaft 10c extends, said hollow shaft 50 being provided with a brake drum 52 with which cooperates a brake band 53. Four friction disks 18c are spaced equal angular distances about the common axis of the shafts 10c, 11c, and 50 and they are disposed with their axes in a common plane at right angles to the common axis of the shafts 10c, 11c, and 50. Moreover, said friction disks are disposed with their axes intersecting the common axis of the shafts 10c, 11c, and 50 and with their inner flat faces engaging the peripheries of the friction wheels 14c, 15c. In addition they are mounted within a thrust ring 33c in the same manner as shown and described with reference to the Figures 3 to 6 embodiments of the invention.

The thrust ring 33c is split as indicated at 45c and at one of the ring ends thus formed is an outwardly projecting lug 46c. Fixed to the other ring end is a member 54 which extends over the first mentioned ring end and which is provided with an inwardly directed lug 55. Between the lugs 46c, 55 is interposed a cam bar 56 which, by rotation, forces said lugs apart and effects contraction of the thrust ring 33c.

Splined on the shaft 11c, as at 57, is a collar 58 having arms 59 engaging the ring 33c so that a constant operative relationship is maintained between the collar and said ring. The collar is provided with a radial slot, as indicated at 60, and the cam bar 56 is provided with a crank arm 61 having a pin 62 which is engaged in said slot 60. Thus, if the collar 58 is rotated relative to the ring 33c, the cam bar 56 is rotated due to the connection of its arm 61 with the collar and as a consequence the lugs 46c, 55 are forced apart, thereby contracting the ring 33c and intensifying the pressure of the friction disks 18c against the friction wheels 14c, 15c.

According to the Figures 7, 8 construction regulation of the gear to vary its ratio is effected by shifting the collar 58 along the shaft 11c, and this may be done in any suitable manner. Shifting of the collar results in shifting of the ring 33c and consequent shifting of the friction disks 18c relative to the friction wheels 14c, 15c.

If the shaft 10c is driven and the brake band 53 is released, rotation of the friction wheel 14c will be transmitted through the friction disks 18c to the friction wheel 15c and the direction of rotation of the latter will be counter to the direction of rotation of the wheel 14c. The gear thus will idle, regardless of the relative positions of the friction wheels and the friction disks. If, on the other hand, the brake band 53 is actuated to hold the drum 52 and thereby the friction wheel 15c against rotation, then rotation of the shaft 10c and the friction wheel 14c will result in planetation of the friction disks 18c and the ring 33c about the friction wheel 15c at a rate of speed which is dependent upon the distances of the contact points between the wheels 14c, 15c and the disks 18c from the centers of the disks 18c. Rotation of the ring 33c will be transmitted through the cam bar 56 and its crank arm 61 to the collar 58 and thereby the shaft 11c will be rotated in the same direction as the shaft 10c and at the same speed as the ring 33c. Since rotation of the ring 33c is transmitted to the collar 58 and the shaft 11c through the crank arm 61, and since swinging of said crank arm results in contraction of the ring 33c, it follows that the friction disks are forced against the friction wheels under a pressure which is proportional to the torque transmitted through the gear for all speed ratios of the gear. Also, it is manifest that by providing a crank arm 61 of proper length, optimum efficiency of the gear may be obtained.

From the foregoing description considered in connection with the accompanying drawings, it is believed that the features of the invention will be clearly understood. It is desired to point out, however, that while only certain specific structural embodiments of the invention have been illustrated and described, the invention is readily capable of embodiment in various other mechanical structures within the spirit and the scope thereof as defined in the appended claims.

I claim:

1. In combination, a friction gear comprising a pair of axially aligned shafts, a friction wheel on each shaft, friction discs rotatable in planes substantially parallel to the common axis of said shafts and engaging the peripheries of the friction wheels for transmitting power therebetween, means for mounting said friction discs whereby they are adapted to move toward the friction wheels, and to pivot about the axis of said shafts, and means adapted to convert the pivotal movement of said discs due to the peripheral force exerted on the friction discs by the friction wheels and tending to turn the friction discs about the common axis of the shafts into a force causing movement of and pressing the friction discs against the friction wheels.

2. In combination, a friction gear comprising a pair of axially aligned shafts, a friction wheel on each shaft, friction discs rotatable in planes substantially parallel to the common axis of said shafts and engaging the peripheries of the friction wheels for transmitting power therebetween, means for mounting said friction discs so that they are adapted to move toward the friction wheels and to pivot about the axis of said shafts, clamp means operable when actuated to press the friction discs against the friction wheels, and means adapted to convert the pivotal movement of said discs due to the peripheral force exerted on the friction discs by the friction wheels and tending to rotate the friction wheels about the common axis of the shafts into a force causing said clamp means to press the friction discs against the friction wheels.

3. A friction gear as set forth in claim 1 in which said mounting means includes a carrier rotatably mounted on one of the shafts and in which the friction discs are mounted on said carrier.

4. A friction gear as set forth in claim 1 in which said mounting means includes a ring disposed substantially axially alined with the common axis of the shafts and in which the friction disks are mounted on said ring within the same.

5. A friction gear as set forth in claim 1 in which the means employed to force the friction disks against the peripheries of the friction wheels includes a lever.

6. A friction gear comprising a pair of axially alined shafts, a friction wheel on each shaft, a contractile ring substantially axially alined with the common axis of said shafts, friction disks within said ring and mounted thereon so as to be rotatable in planes substantially parallel to the common axis of the shafts and so as to engage the peripheries of said friction wheels, means whereby contraction of said ring presses the friction disks against the friction wheels, and means adapted to cause the tendency of the friction wheels and ring to rotate about the common axis of the shafts under the influence of rotation of the friction wheels to contract said ring.

7. A friction gear as set forth in claim 1 in which said mounting means comprises a carrier for the friction discs, and means mounting each friction disc on said carrier for self-adjustment with respect thereto in a plane including the common axis of the shafts and the axis of the friction discs.

8. A friction gear as set forth in claim 1 comprising more than two friction disks spaced apart equal angular distances about the common axis of the shafts.

9. A friction gear as set forth in claim 1 including means for releasably securing one of the friction wheels against rotation.

10. A friction gear comprising a pair of axially alined shafts, a friction wheel on each shaft, a deformable ring, supports on the shafts holding the ring substantially axially alined with the shafts, friction disks carried by the ring within the same, said disks engaging the peripheries of the friction wheels and being rotatable in planes parallel with respect to the common axis of the shafts and movable toward the friction wheels, means adapted to cause deformation of the ring so to press the disks against said wheels, clamp shoes embracing the ring, and lever means connecting said clamp shoes adapted to cause the tendency of the disks and ring to rotate with the wheels actuate said shoes to deform the ring.

11. A friction gear as set forth in claim 10 including a mounting for each friction disk whereby it is adapted for self-adjustment against the friction wheels in a plane including the axis of the disk and the common axis of the shafts.

12. A friction gear comprising a pair of axially alined shafts, a friction wheel on each shaft, a split ring substantially axially alined with said shafts, friction disks mounted on said ring within the same, said disks engaging the peripheries of said wheels and being rotatable on axes radial with respect to said shafts, means whereby contraction of said ring presses the disks against the wheels, and lever means operable in response to tendency of the disks and the ring to rotate with the wheels to contract said ring.

13. A friction gear as set forth in claim 12 including a mounting for each friction disk whereby it is adapted for self-adjustment against the friction wheels in a plane including the axis of the disk and the common axis of the shafts.

14. A friction gear as set forth in claim 12 including more than two friction disks disposed equal angular distances about the common axis of the shafts.

15. A friction gear comprising three axially alined shafts, a friction wheel on each of two of said shafts, means for releasably holding one of said friction wheel carrying shafts against rotation, a contractile ring substantially axially alined with said shafts, friction disks mounted on said ring within the same, said disks engaging the peripheries of said wheels and being rotatable on axes radial with respect to said shafts, means whereby contraction of said ring presses the disks against the wheels, a cranked member operable by rotation to contract said ring, and a connection between said cranked member and the shaft which is devoid of a friction wheel whereby rotation of the ring is imparted to the latter shaft and whereby the tendency of the crank to rotate under the transmission of torque contracts said ring.

16. A friction gear as set forth in claim 15 including a mounting for each friction disk whereby it is adapted for self-adjustment against the friction wheels in a plane including the axis of the disk and the common axis of the shafts.

17. A friction gear as set forth in claim 15 in which an element is coupled with the ring and splined to the shaft which is devoid of a friction wheel, and in which the cranked member is connected with said element.

18. In combination, a gear comprising a pair of axially alined shafts, a friction wheel on each shaft, friction discs rotatable in planes substantially parallel to the common axis of said shafts and engaging the peripheries of the friction wheels for transmitting power therebetween, a mounting for said friction discs whereby they are adapted to move toward the friction wheels, and to pivot about the common axis of the shafts, and means adapted to convert the peripheral force exerted on the friction discs by the friction wheels and causing turning of the friction discs about the common axis of the shafts into a force causing movement of and pressing the friction discs against the friction wheels.

19. In combination, a gear comprising a pair of axially alined shafts, a friction wheel on each shaft, a pair of friction discs rotatable in planes substantially parallel to the common axis of said shafts and engaging the peripheries of the friction wheels for transmitting power therebetween, a mounting for said friction discs whereby they are adapted to move toward the friction wheels, and to pivot about the common axis of the shafts, clamp means operable when actuated to press the friction discs against the friction wheels, and means adapted to convert the pivotal movement of said friction discs about the said common axis of the shafts as a result of the peripheral force exerted on the friction discs by the friction wheels and tending to rotate the friction discs about the common axis of the shafts into a force causing actuation of said clamp to press the friction discs against the friction wheels.

20. In combination a friction gear comprising a pair of axially aligned shafts, a friction wheel on each shaft, friction discs rotatable in planes substantially parallel to the common axis of said shafts and engaging the peripheries of the friction wheels for transmitting power therebetween, a mounting for each of said friction discs whereby they are adapted to move toward or away from the friction wheels and also pivotally about the axis of said wheels and means adapted to convert the pivotal movement resulting from the peripheral force exerted on the friction discs by the friction wheels and tending to turn the friction discs about the common axis of the shafts into a movement causing said friction discs to press against the friction wheels.

21. In combination, a friction gear comprising a pair of axially aligned shafts, one being a driven shaft and the other a driving shaft, a friction wheel on each shaft, friction discs rotatable in planes substantially parallel to the common axis of said shafts and engaging the peripheries of the friction wheels for transmitting power therebetween, a mounting for said friction discs whereby they are adapted to move toward the friction wheels, and to pivot about the axis of said shafts, and means adapted to convert the peripheral force exerted on the friction discs by the friction wheels and causing turning of the friction discs about the common axis of the shafts, into a force causing movement of and pressing the friction discs against the friction wheels.

22. In combination a friction gear comprising a pair of axially aligned shafts, one being a driven shaft and the other a driving shaft, a friction wheel on each shaft, friction discs rotatable in planes substantially parallel to the common axis of said shafts and engaging the peripheries of the friction wheels for transmitting power therebetween, means for mounting said friction discs whereby they are adapted to move toward the friction wheels in either direction, and to pivot about the axis of said shafts in either direction and means adapted to convert the peripheral force exerted on the friction discs by the friction wheels, in either direction of rotation thereof, and causing turning of the friction discs about the common axis of the shafts into a force causing movement of and pressing the friction discs against the friction wheels, whereby said means will be operative to cause pressure of the friction discs against said friction wheels, in either direction of rotation of said driving friction wheel.

RICHARD ERBAN.